J. STEPHENSON

STREET-CAR.

No. 6,989. Reissued March 7, 1876.

*Witnesses:*

D. G. Stuart

James H. Weld

*Inventor:*

John Stephenson by P. Hanway

Atty.

UNITED STATES PATENT OFFICE.

JOHN STEPHENSON, OF NEW YORK, N. Y.

IMPROVEMENT IN STREET-CARS.

Specification forming part of Letters Patent No. 61,482, dated January 22, 1867; reissue No. 6,696, dated October 11, 1875; reissue No. 6,989, dated March 7, 1876; application filed December 17, 1875.

DIVISION E[7].

*To all whom it may concern:*

Be it known that I, JOHN STEPHENSON, of New York, in the county of New York and State of New York, have invented certain new and useful Improvements in Street-Cars; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1:
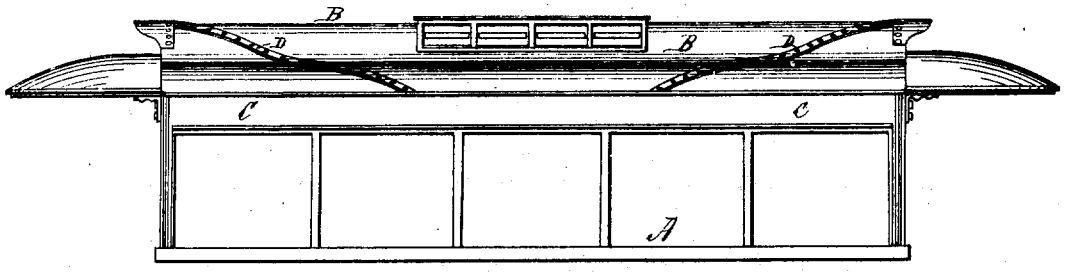
Figure 2:
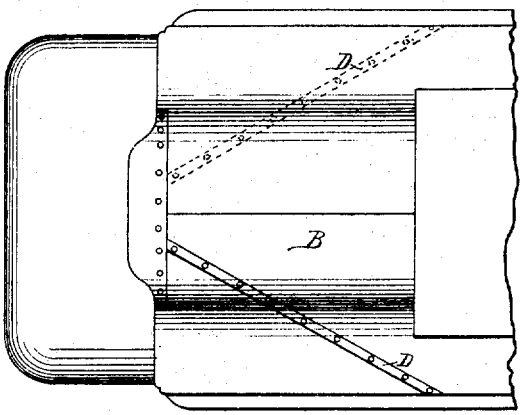

Figure 1 represents a side elevation of the upper portion of the body of a street-car to which my improvement has been applied, and Fig. 2 a plan or top view of one end of the same, the other being broken off.

In the construction of street-cars it is desirable to build them as light as practicable, consistent with strength and durability. The arched form of the roof causes thrust against the side walls of the car-body. The walls are unable to resist the thrust, and are consequently forced outward, permitting the roof to settle, and otherwise causing derangement of the structure. This subdivision of my invention is designed to remedy this evil.

My invention for this purpose consists in strengthening the upper portion of the car-body by re-enforcing it with anchor-strips arranged to extend from the central or highest parts of the car ends in a diagonal direction to the eaves of the roof, where in each case they are properly secured in any known and suitable way.

To enable others skilled in the art to make, construct, and use my invention, I will now proceed to describe its parts in detail, omitting a particular description of such parts of a street-car as is unnecessary to a full understanding of my present improvement.

For the purposes of my invention, the car-body A may be of any of the usual forms of construction, in which the roof B rises at its center above the side walls C of the car.

At or near the highest or central parts of each end of the car are secured one end of each of two anchor-strips, D, the other end of each of which is extended across the roof in a diagonal direction to the eaves, where it is properly secured in any known way.

In practice I prefer that those ends of the strips which are secured at the eaves should be located at a point distant from the corner of the roof, about one-third of the length of the car-body. Each of these anchor-strips should also be screwed or otherwise secured to each rafter they cross. For this purpose they should be so bent or otherwise formed as to conform to the outer or inner contour of the roof according as they are arranged on the inner or outer surface of the roof. As a rule I prefer to make them of metal, and to arrange them on the outside of the roof immediately beneath the canvas cover. The anchor-strips thus applied, it will be apparent that the roof will be retained in its rectangular form, and consequently cannot settle nor exert an injurious influence on the side walls of the car-body by the lateral thrust of its rafters.

Having described my invention, what I claim as new, and desire to secure by Letters Patent, is—

A car-roof, provided with anchor-strips D, in the manner and for the purposes substantially as set forth.

In testimony that I claim the foregoing I have hereunto set my hand this 3d day of December, 1875.

JOHN STEPHENSON.

Witnesses:
S. A. STEPHENSON,
AUGUST RIPPERGER.